(12) United States Patent
Griffin et al.

(10) Patent No.: US 12,561,598 B2
(45) Date of Patent: Feb. 24, 2026

(54) DEBUGGING EXECUTING QUANTUM SERVICES USING SERVICE DEFINITION LAYERS

(71) Applicant: Red Hat, Inc., Raleigh, NC (US)

(72) Inventors: Leigh Griffin, Waterford (IE); Stephen Coady, Waterford (IE)

(73) Assignee: Red Hat, LLC, Raleigh, NC (US)

( * ) Notice: Subject to any disclaimer, the term of this patent is extended or adjusted under 35 U.S.C. 154(b) by 1037 days.

(21) Appl. No.: 17/680,601

(22) Filed: Feb. 25, 2022

(65) Prior Publication Data

US 2023/0274178 A1     Aug. 31, 2023

(51) Int. Cl.
| | |
|---|---|
| *G06N 10/80* | (2022.01) |
| *G06F 11/3698* | (2025.01) |
| *G06N 10/20* | (2022.01) |

(52) U.S. Cl.
CPC ......... *G06N 10/80* (2022.01); *G06F 11/3698* (2025.01); *G06N 10/20* (2022.01)

(58) Field of Classification Search
None
See application file for complete search history.

(56) References Cited

U.S. PATENT DOCUMENTS

| | | | | |
|---|---|---|---|---|
| 10,698,789 | B1 * | 6/2020 | Liu | G06F 8/31 |
| 11,366,741 | B2 * | 6/2022 | Geller | G06F 11/3698 |
| 2019/0179730 | A1 * | 6/2019 | Geller | G06F 11/3698 |
| 2020/0116784 | A1 * | 4/2020 | Liu | G01R 31/31702 |
| 2020/0175414 | A1 * | 6/2020 | Bishop | G06N 10/20 |

OTHER PUBLICATIONS

Li, "Debugging Quantum Processes Using Monitoring Measurements", 2014, arXiv:1403.4344v1 (Year: 2014).*
Huang, "Statistical Assertions for Validating Patterns and Finding Bugs in Quantum Programs", 2019, ACM (Year: 2019).*
Author Unknown, "Source code for qutip.qip.qasm," QuTiP: Quantum Toolbox in Python, 2011, https://qutip.org/docs/latest/modules/qutip/qip/qasm.html, 18 pages.
Huang, Y. et al., "Statistical Assertions for Validating Patterns and Finding Bugs in Quantum Programs," The 46th Annual International Symposium on Computer Architecture (ISCA '19), Jun. 22-26, 2019, Phoenix, AZ, USA, ACM, pp. 541-553.
Javadiabhari, A. et al., "ScaffCC: Scalable Compilation and Analysis of Quantum Programs," arXiv:1507.01902v1 [quant-ph], Jul. 7, 2015, 37 pages.
Zulehner, A. et al., "An Efficient Methodology for Mapping Quantum Circuits to the IBM QX Architectures," arXiv:1712.04722v3 [quant-ph], Jun. 7, 2018, 11 pages.

* cited by examiner

*Primary Examiner* — Hossain M Morshed
(74) *Attorney, Agent, or Firm* — Dority & Manning, P.A.

(57) ABSTRACT

Debugging executing quantum services using service definition layers is disclosed herein. In one example, a processor device of a quantum computing device receives a request to debug an executing quantum service defined by a quantum service definition file. In response, the processor device suspends execution of the quantum service, and determines a next instruction to be executed within the quantum service definition file. The processor device next identifies a service definition layer associated with the quantum service definition file and corresponding to the next instruction, wherein the service definition layer comprises the next instruction and any instructions preceding the next instruction. The processor device then executes the service definition layer.

20 Claims, 7 Drawing Sheets

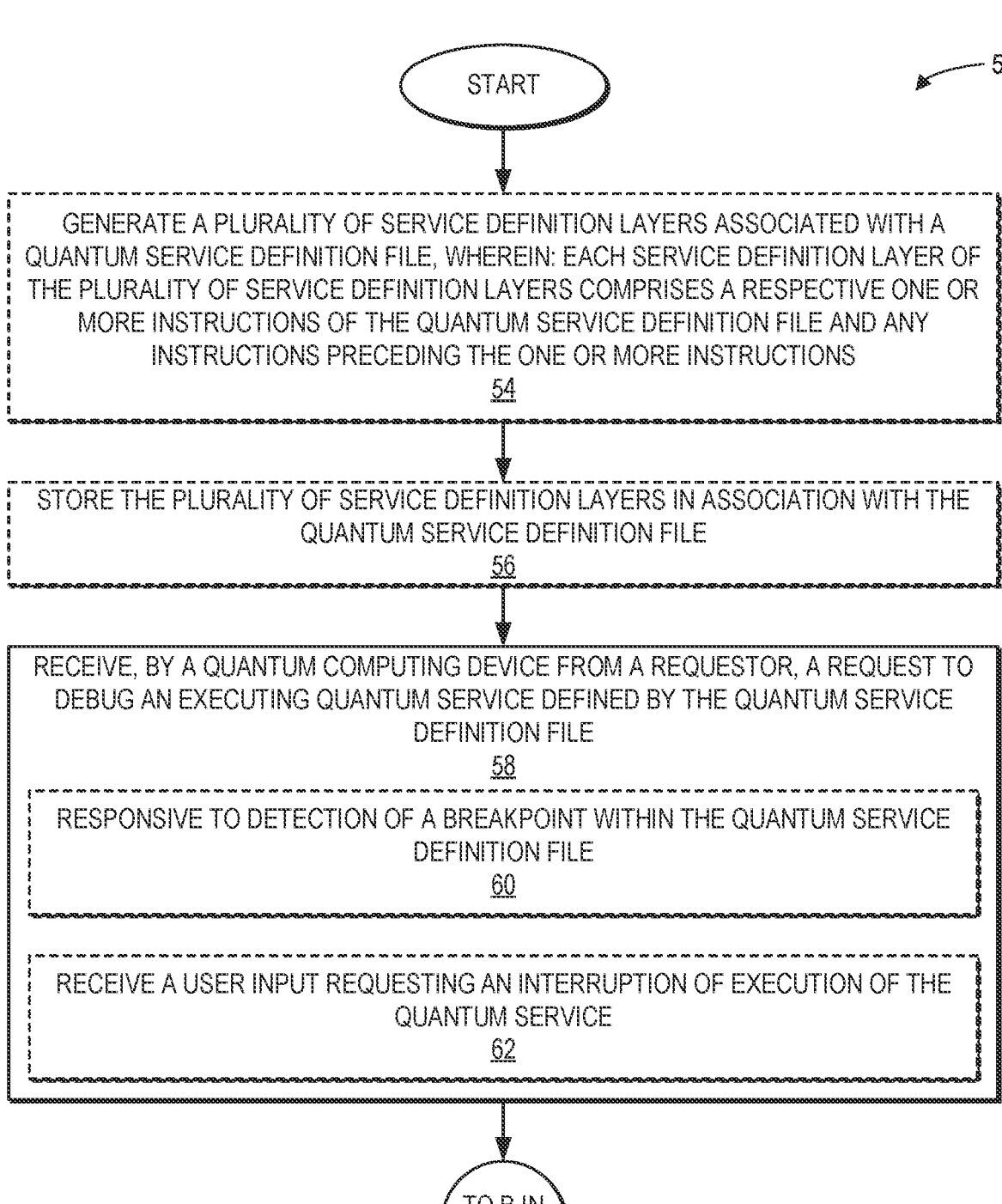

START

— 52

GENERATE A PLURALITY OF SERVICE DEFINITION LAYERS ASSOCIATED WITH A QUANTUM SERVICE DEFINITION FILE, WHEREIN: EACH SERVICE DEFINITION LAYER OF THE PLURALITY OF SERVICE DEFINITION LAYERS COMPRISES A RESPECTIVE ONE OR MORE INSTRUCTIONS OF THE QUANTUM SERVICE DEFINITION FILE AND ANY INSTRUCTIONS PRECEDING THE ONE OR MORE INSTRUCTIONS
54

STORE THE PLURALITY OF SERVICE DEFINITION LAYERS IN ASSOCIATION WITH THE QUANTUM SERVICE DEFINITION FILE
56

RECEIVE, BY A QUANTUM COMPUTING DEVICE FROM A REQUESTOR, A REQUEST TO DEBUG AN EXECUTING QUANTUM SERVICE DEFINED BY THE QUANTUM SERVICE DEFINITION FILE
58

RESPONSIVE TO DETECTION OF A BREAKPOINT WITHIN THE QUANTUM SERVICE DEFINITION FILE
60

RECEIVE A USER INPUT REQUESTING AN INTERRUPTION OF EXECUTION OF THE QUANTUM SERVICE
62

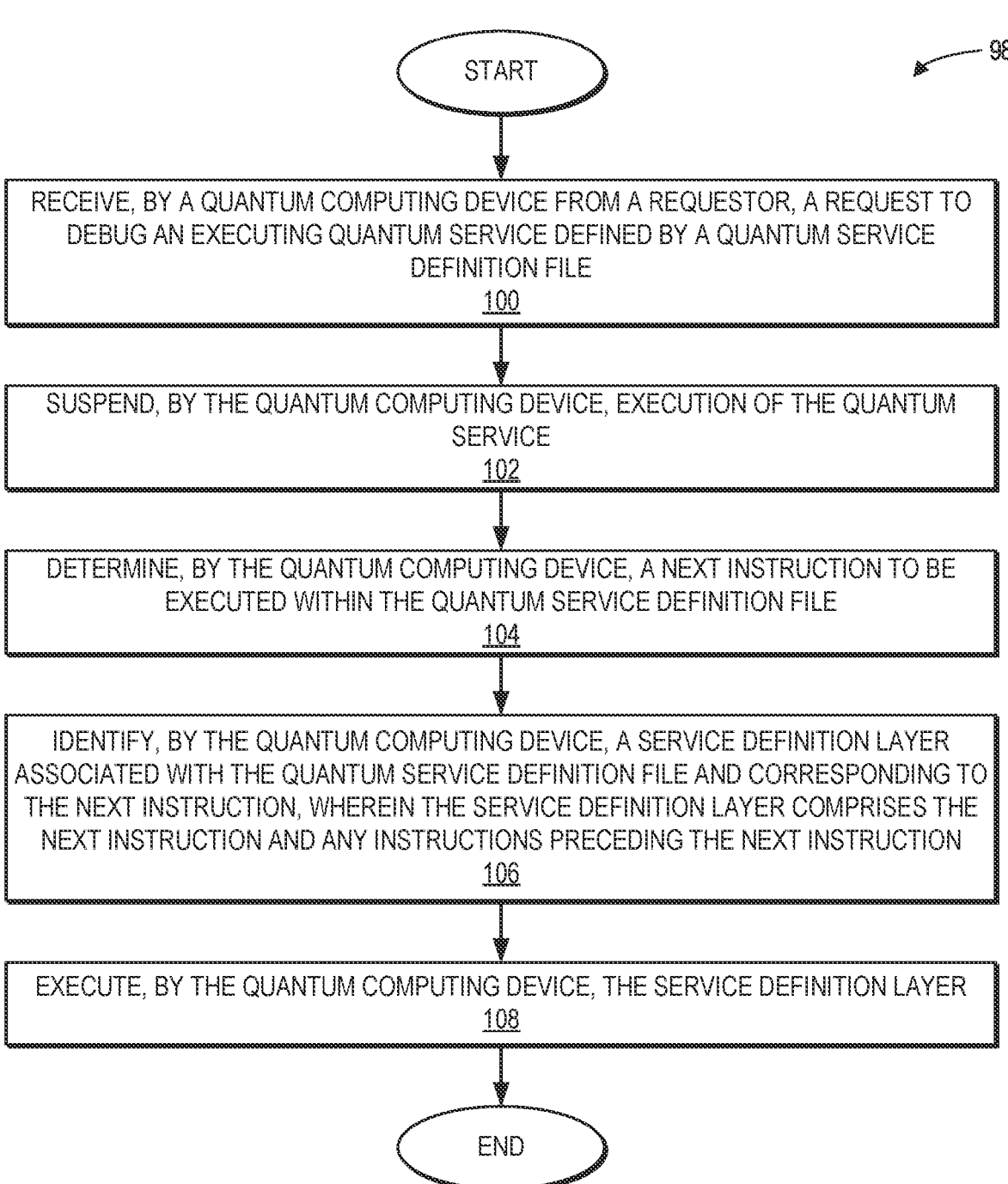

START

98

RECEIVE, BY A QUANTUM COMPUTING DEVICE FROM A REQUESTOR, A REQUEST TO DEBUG AN EXECUTING QUANTUM SERVICE DEFINED BY A QUANTUM SERVICE DEFINITION FILE
100

SUSPEND, BY THE QUANTUM COMPUTING DEVICE, EXECUTION OF THE QUANTUM SERVICE
102

DETERMINE, BY THE QUANTUM COMPUTING DEVICE, A NEXT INSTRUCTION TO BE EXECUTED WITHIN THE QUANTUM SERVICE DEFINITION FILE
104

IDENTIFY, BY THE QUANTUM COMPUTING DEVICE, A SERVICE DEFINITION LAYER ASSOCIATED WITH THE QUANTUM SERVICE DEFINITION FILE AND CORRESPONDING TO THE NEXT INSTRUCTION, WHEREIN THE SERVICE DEFINITION LAYER COMPRISES THE NEXT INSTRUCTION AND ANY INSTRUCTIONS PRECEDING THE NEXT INSTRUCTION
106

EXECUTE, BY THE QUANTUM COMPUTING DEVICE, THE SERVICE DEFINITION LAYER
108

END

*FIG. 4*

DEBUGGING EXECUTING QUANTUM SERVICES USING SERVICE DEFINITION LAYERS

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices to provide desired functionality. As quantum computing continues to increase in popularity and become more commonplace, functionality for debugging quantum services that are executing on quantum computing devices will be desirable.

SUMMARY

The examples disclosed herein provide debugging executing quantum services using service definition layers in quantum computing systems. In one example, a quantum debugging service, executing on a quantum computing device, provides a mechanism for simulating real-time debugging of an executing quantum process that is defined by a quantum service definition file by employing service definition layers that are associated with the quantum service definition file, and that each correspond to one or more instructions of the quantum service definition file and include the one or more instructions and any preceding instructions.

In another example, a method for debugging executing quantum services using service definition layers is disclosed. The method comprises receiving, by a quantum computing device from a requestor, a request to debug an executing quantum service defined by a quantum service definition file. The method further comprises suspending, by the quantum computing device, execution of the quantum service. The method also comprises determining, by the quantum computing device, a next instruction to be executed within the quantum service definition file. The method additionally comprises identifying, by the quantum computing device, a service definition layer associated with the quantum service definition file and corresponding to the next instruction, wherein the service definition layer comprises the next instruction and any instructions preceding the next instruction. The method further comprises executing, by the quantum computing device, the service definition layer.

In another example, a quantum computing device for debugging executing quantum services using service definition layers is disclosed. The quantum computing device comprises a system memory, and a processor device communicatively coupled to the system memory. The processor device is to receive, from a requestor, a request to debug an executing quantum service defined by a quantum service definition file. The processor device is further to suspend execution of the quantum service. The processor device is also to determine a next instruction to be executed within the quantum service definition file. The processor device is additionally to identify a service definition layer associated with the quantum service definition file and corresponding to the next instruction, wherein the service definition layer comprises the next instruction and any instructions preceding the next instruction. The processor device is further to execute the service definition layer.

In another example, a non-transitory computer-readable medium for debugging executing quantum services using service definition layers is disclosed. The non-transitory computer-readable medium stores thereon computer-executable instructions that, when executed, cause one or more processor devices of a quantum computing device to receive, from a requestor, a request to debug an executing quantum service defined by a quantum service definition file. The computer-executable instructions further cause the one or more processor devices to suspend execution of the quantum service. The computer-executable instructions also cause the one or more processor devices to determine a next instruction to be executed within the quantum service definition file. The computer-executable instructions additionally cause the one or more processor devices to identify a service definition layer associated with the quantum service definition file and corresponding to the next instruction, wherein the service definition layer comprises the next instruction and any instructions preceding the next instruction. The computer-executable instructions further cause the one or more processor devices to execute the service definition layer.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIGS. 2A-2C are flowcharts illustrating operations performed by the computing system of FIG. 1 for debugging executing quantum services using service definition layers, according to one example;

FIG. 4 is a flowchart of a simplified method for debugging executing quantum services using service definition layers by the quantum computing device of FIG. 3, according to one example.

DETAILED DESCRIPTION

Figure 1:
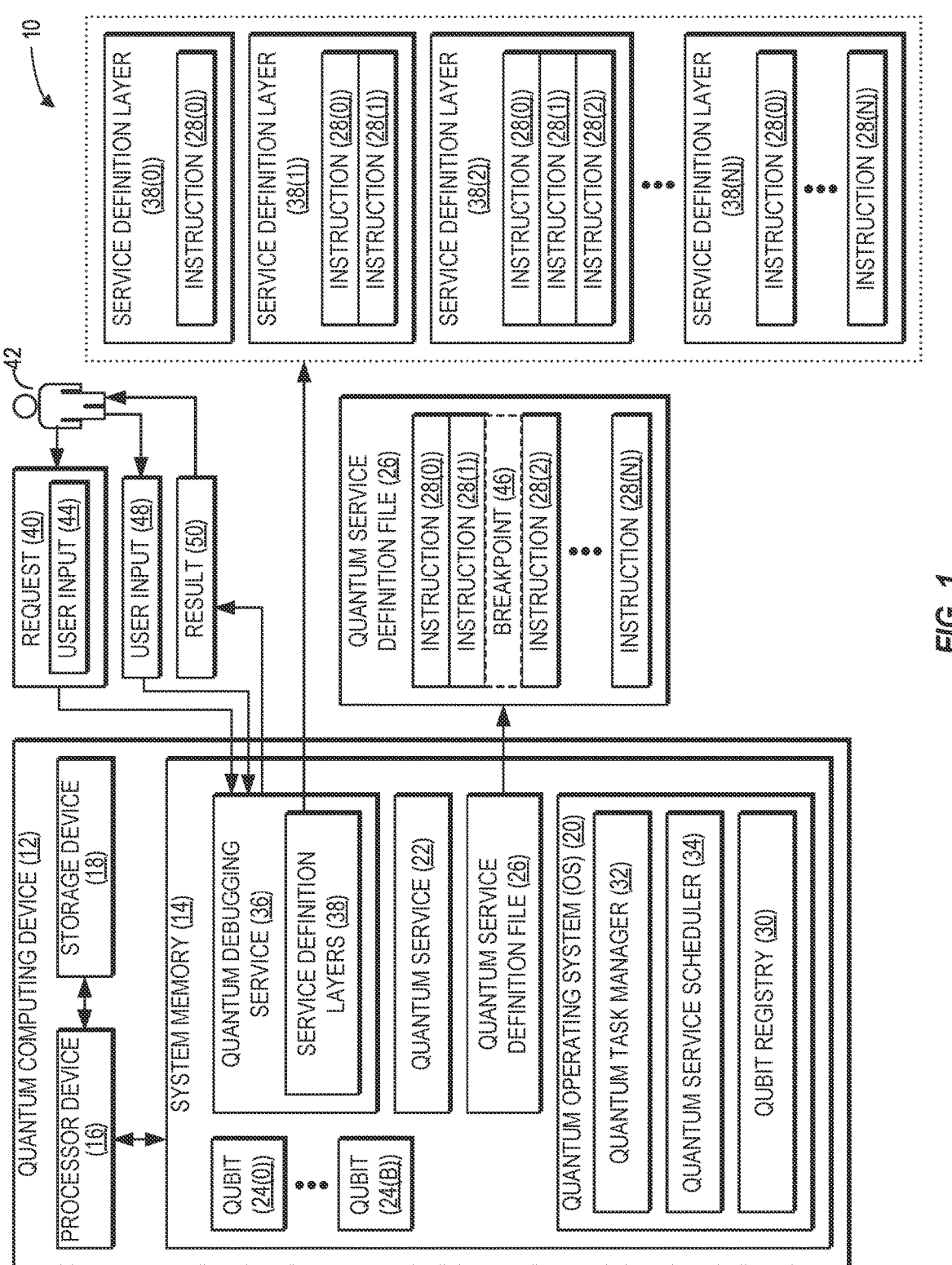
FIG. 1 is a block diagram of a computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first quantum service" and "second quantum service," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," each of which has properties (such as superposition and entanglement) that differ from those of classical (i.e., non-quantum) bits used in classical computing. Qubits may be employed by quantum services that are executed by quantum computing devices to provide desired functionality. The process for instantiating qubits, placing them into specific quantum states and relationships, storing values using the qubits, and/or subsequently deallocating and reusing the qubits may require the execution of multiple instruction sequences. As a result, conventional debugging techniques for, e.g., pausing execution of a process, stepping forward and/or backward among the executing instructions of the process, and/or manipulating real-time data values in use by the process may be impractical or impossible in the context of debugging an executing quantum service. Thus, as quantum computing continues to increase in popularity and become more commonplace, functionality for debugging quantum services that are executing on quantum computing devices will be desirable.

In this regard, examples disclosed herein implement a quantum debugging service for debugging executing quantum services using service definition layers. The quantum debugging service is executed by a processor device of a quantum computing device and provides a mechanism for simulating real-time debugging of an executing quantum process that is defined by a quantum service definition file (e.g., a Quantum Assemble (QASM) file, as a non-limiting example). The quantum debugging service makes use of a plurality of service definition layers that are associated with the quantum service definition file. Each service definition layer corresponds to one or more instructions of the quantum service definition file and includes the one or more instructions as well as any preceding instructions within the quantum service definition file.

For instance, a quantum service definition file that contains five (5) instructions may be associated with a corresponding five (5) service definition layers, as follows:

The first service definition layer corresponds to the first instruction within the quantum service definition file, and may comprise only the first instruction within the quantum service definition file;

The second service definition layer corresponds to the second instruction within the quantum service definition file, and may comprise the first and second instructions within the quantum service definition file;

The third service definition layer corresponds to the third instruction within the quantum service definition file, and may comprise the first, second, and third instructions within the quantum service definition file;

The fourth service definition layer corresponds to the fourth instruction within the quantum service definition file, and may comprise the first, second, third, and fourth instructions within the quantum service definition file; and The fifth service definition layer corresponds to the fifth instruction within the quantum service definition file, and may comprise the first, second, third, fourth, and fifth instructions within the quantum service definition file.

Note that, because the fifth service definition layer is effectively the same as the quantum service definition file, it may be omitted in some examples. Moreover, in some examples, each service definition layer may correspond to multiple instructions (e.g., where more than one instruction is required to accomplish a single task carried out by the quantum service).

In exemplary operation, the quantum debugging service receives, from a requestor, a request to debug an executing quantum service defined by a quantum service definition file. In some examples, the request may be received from a quantum operating system (OS) executing the quantum service in response to detection of a breakpoint within the quantum service definition file, while some examples may provide that the request may be received from a user in the form of a user input requesting interruption of execution of the quantum service. In response to receiving the request, the quantum debugging service suspends execution of the quantum service (e.g., by invoking functionality of a quantum task manager of the quantum computing device), and optionally may terminate the quantum service.

The quantum debugging service then determines a next instruction to be executed within the quantum service definition file. The next instruction in some examples may be determined by the quantum debugging service as an instruction immediately subsequent, in program order, an instruction identified as the most recently executed instruction within the quantum service definition file. Some examples may provide that the next instruction may be determined based on a user input indicating the next instruction, such as a user input to step forward, step backward, or jump to an arbitrary instruction. In such examples, the next instruction may comprise an instruction immediately subsequent to the most recently executed instruction, an instruction immediately preceding the most recently executed instruction, or a user-selected instruction within the quantum service definition file, respectively.

The quantum debugging service next identifies a service definition layer associated with the quantum service definition file and corresponding to the next instruction, and then executes the service definition layer (i.e., by executing the instructions for the service definition layer). In some examples, the quantum debugging service may then provide a result of executing the service definition layer to the requestor (e.g., by displaying the result to the user, as a non-limiting example). The result may comprise a quantum state of a qubit during execution of the service definition layer and/or a data value stored by a qubit during execution of the service definition layer and may be obtained by the quantum debugging service by querying a qubit registry of the quantum computing device.

By executing service definition layers corresponding to specific instructions within the quantum service definition file, the quantum debugging service can be employed to provide a user experience for debugging an executing quantum service that is similar to that provided by a conventional debugger when debugging a classical process. For instance, from the user's perspective, the user may be able to step forward or backwards one instruction at a time within the quantum service definition file and may view the changing results and values of qubits used by the quantum service in real time. Behind the scenes, the quantum debugging service is actually executing a service definition layer corresponding to each specific instruction and any preceding instructions and may obtain and provide the results of executing each service definition layer to the user.

Some examples may also provide that the quantum debugging service, prior to receiving the request to debug the executing quantum service, generates the plurality of service definition layers associated with the quantum service definition file, wherein each service definition layer of the plurality of service definition layers comprises a respective one or more instructions of the quantum service definition file and any instructions preceding the one or more instructions. Each service definition layer may contain copies of the instructions or may contain pointers or references to the instructions within the quantum service definition file. The plurality of service definition layers may then be stored in association with the quantum service definition file (e.g., using a storage device such as a hard drive or flash memory). For instance, the service definition layers may be stored as part of a manifest for the quantum service, or as part of the quantum service definition file.

FIG. 1 is a block diagram of a computing system 10 according to one example. The computing system 10 includes a quantum computing device 12 that comprises a system memory 14 and a processor device 16. The quantum computing device 12 also comprises a storage device 18 that is communicatively coupled to the processor device 16, and that may comprise, e.g., a hard drive, a flash memory, or other persistent data storage device. It is to be understood that the computing system 10, according to some examples, may include more or fewer quantum computing devices and/or classical computing devices than illustrated in FIG. 1. Additionally, the quantum computing device 12 in some examples may include constituent elements in addition to those illustrated in FIG. 1.

The quantum computing device 12 in FIG. 1 operates in quantum environments but is capable of operating using classical computing principles or quantum computing principles. When using quantum computing principles, the quantum computing device 12 performs computations that utilize quantum-mechanical phenomena, such as superposition and/or entanglement states. The quantum computing device 12 may operate under certain environmental conditions, such as at or near zero degrees (0°) Kelvin. When using classical computing principles, the quantum computing device 12 utilizes binary digits that have a value of either zero (0) or one (1).

In the example of FIG. 1, the quantum computing device 12 executes a quantum OS 20 that provides functionality for managing execution of quantum services such as a quantum service 22. The quantum service 22 comprises a process that employs one or more qubits such as qubits 24(0)-24(B) to perform quantum operations. The quantum service 22 of FIG. 1 is defined by a quantum service definition file 26, which comprises a plurality of quantum programming instructions (referred to herein as "instructions" and captioned as "INSTRUCTION" in FIG. 1) 28(0)-28(N) for allocating and manipulating qubits to achieve a desired functionality. The quantum service definition file 26 in some examples may comprise a QASM file, as a non-limiting example. Each of the qubits 24(0)-24(B) may be used by quantum services such as the quantum service 22 to store a data value (not shown), and/or may have a quantum state (not shown) (e.g., spin, as a non-limiting example) into which the qubit 24(0)-24(B) is programmatically placed.

To maintain information for qubits such as the qubits 24(0)-24(B), the quantum OS 20 provides a qubit registry 30, which comprises a plurality of qubit registry entries (not shown) that each correspond to a qubit. The qubit registry 30 maintains and provides access to data relating to the qubits implemented by the quantum computing device 12, including a count of the total number of qubits implemented by the quantum computing device 12, and a count of the number of available qubits that are currently available for allocation, as non-limiting examples. Each of the qubit registry entries of the qubit registry 30 also stores qubit metadata for a corresponding qubit. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an entanglement indicator that indicates whether the corresponding qubit is in an entangled state. The functionality of the qubit registry 30 may be made accessible to other services and processes (e.g., via defined Application Programming Interfaces (APIs), as a non-limiting example).

Execution of quantum services such as the quantum service 22 is facilitated by a quantum task manager 32 and a quantum service scheduler 34, each of which operates in a manner analogous to their conventional classical counterparts. Thus, the quantum task manager 32 of the quantum OS 20 handles operations for creating, monitoring, and terminating quantum services. Likewise, the quantum service scheduler 34 of the quantum OS 20 controls the scheduling of quantum services for execution by the processor device 16 and the allocation of processing resources to executing quantum services. The functionality of the quantum task manager 32 and the quantum service scheduler 34 may be made accessible to other services and processes (e.g., via defined APIs, as a non-limiting example).

As quantum computing continues to increase in popularity and become more commonplace, functionality for debugging executing quantum services such as the quantum service 22 will be desirable. Accordingly, in this regard, the processor device 16 of the quantum computing device 12 executes a quantum debugging service 36 for debugging executing quantum services using service definition layers. The quantum debugging service 36 provides a mechanism for simulating real-time debugging of the executing quantum service 22 that is defined by the quantum service definition file 26. In some examples, the quantum debugging service 36 generates a plurality of service definition layers 38(0)-38(N) (collectively referred to herein as "service definition layers 38") based on the quantum service definition file 26. Each of the service definition layers 38(0)-38(N) corresponds to one or more of the instructions 28(0)-28(N) of the quantum service definition file 26 and includes both the corresponding one or more instructions and any preceding instructions within the quantum service definition file 26. Thus, in the example of FIG. 1, the service definition layer 38(0) includes only the instruction 28(0), while the service definition layer 38(1) includes the instructions 28(0)-28(1), the service definition layer 38(2) includes the instructions 28(0)-28(2), and so on in like fashion. Note that, because the service definition layer 38(N) includes the same set of instructions as the quantum service definition file 26 itself, the service definition layer 38(N) may be omitted in some examples. The service definition layers 38(0)-38(N) each may comprise copies of the instructions contained therein or may comprise pointers or references to the instructions within the quantum service definition file 26.

In the example of FIG. 1, each of the service definition layers 38(0)-38(N) corresponds to a single one of the instructions 28(0)-28(N). However, it is to be understood that one or more of the service definition layers 38(0)-38(N) may correspond to more than one instruction 28(0)-28(N). For example, some tasks involved with allocating and configuring qubits may require multiple instructions 28(0)-28(N) which may be grouped together within one of the service definition layers 38(0)-38(N). As discussed in greater detail below, multiple instructions 28(0)-28(N) may be identified as instructions to be grouped together within one of the service definition layers 38(0)-38(N) based on formatting of the instructions 28(0)-28(N) within the quantum service definition file 26, and/or based on generation rules (not shown) applied by the quantum debugging service 36 during generation of the service definition layers 38(0)-38(N).

In exemplary operation, the quantum debugging service 36 receives a request 40 to debug an executing quantum service such as the quantum service 22 from a requestor 42. As seen in FIG. 1, the requestor 42 in some examples may comprise a user of the quantum computing device 12, and the request 40 may comprise a user input 44 requesting interruption of execution of the quantum service 22. While not shown in FIG. 1, some examples may provide that the requestor 42 comprises the quantum OS 20 executing the quantum service 22, and the request 40 may be received by the quantum debugging service 36 from the quantum OS 20 in response to detection of a breakpoint 46 (i.e., a reserved keyword indicating that execution of the quantum service definition file 26 should be interrupted) within the quantum service definition file 26. In response to receiving the request 40, the quantum debugging service 36 suspends execution of the quantum service 22, and in some examples may terminate the quantum service 22 and deallocate any qubits 24(0)-24(B) used by the quantum service 22. This may be accomplished by the quantum debugging service 36 invoking functionality of the quantum task manager 32 and/or the qubit registry 30 of the quantum computing device 12.

After receiving the request 40, the quantum debugging service 36 determines a next instruction to be executed within the quantum service definition file 26. In examples in which the breakpoint 46 was encountered or in which a user requested interruption of execution of the quantum service 22, the next instruction may be determined by the quantum debugging service 36 as an instruction immediately subsequent, in program order, an instruction identified as the most recently executed instruction. In some examples, the next instruction may be determined based on a user input 48 that indicates the next instruction, such as a user input to step forward, step backward, or jump to an arbitrary instruction. Accordingly, in such examples, the next instruction may comprise an instruction immediately subsequent to the most recently executed instruction, an instruction immediately preceding the most recently executed instruction, or a user-selected instruction within the quantum service definition file 26, respectively. In the example of FIG. 1, it is assumed for the sake of illustration that the instruction 28(2) following the breakpoint 46 is the next instruction 28(2).

The quantum debugging service 36 next identifies the service definition layer 38(2) associated with the quantum service definition file 26 as corresponding to the next instruction 28(2) and executes the service definition layer 38(2). This results in, e.g., quantum resources such as the qubits 24(0)-24(B) being reallocated for execution of the service definition layer 38(2), and the instructions 28(0)-28(2) being executed. In some examples, the quantum debugging service 36 may then obtain and provide a result 50 of executing the service definition layer 38(2) to the requestor 42 by, e.g., displaying the result 50 to a user, as a non-limiting example. The result 50 may comprise a quantum state of one of the qubits 24(0)-24(B) during execution of the service definition layer 38(2) and/or a data value stored by one of the qubits 24(0)-24(B) during execution of the service definition layer 38(2) and may be obtained by the quantum debugging service 36 by querying the qubit registry 30 of the quantum computing device 12.

According to some examples, the quantum debugging service 36, prior to receiving the request 40 to debug the executing quantum service 22, generates the plurality of service definition layers 38(0)-38(N) associated with the quantum service definition file 26. For instance, the quantum debugging service 36 may parse the quantum service definition file 26 and assign each of the instructions 28(0)-28(N) to a corresponding service definition layer 38(0)-38(N). In some examples, each of the instructions 28(0)-28(N) may individually correspond to one of the service definition layers 38(0)-38(N), while some examples may provide that multiple instructions 28(0)-28(N) (e.g., instructions that together accomplish a particular task such as allocating a qubit) may correspond to one of the service definition layers 38(0)-38(N). The quantum debugging service 36 may identify multiple instructions 28(0)-28(N) as instructions to be grouped together within one of the service definition layers 38(0)-38(N) based on formatting of the instructions 28(0)-28(N) within the quantum service definition file 26, and/or based on generation rules (not shown) applied by the quantum debugging service 36 during generation of the service definition layers 38(0)-38(N). The service definition layers 38(0)-38(N) may then be stored in association with the quantum service definition file 26 (e.g., using the storage device 18 of the quantum computing device 12). The service definition layers 38(0)-38(N) may be stored as part of a manifest for the quantum service 22, or as part of the quantum service definition file 26, as non-limiting examples.

It is to be understood that, because the quantum debugging service 36 is a component of the quantum computing device 12, functionality implemented by the quantum debugging service 36 may be attributed to the computing system 10 generally. Moreover, in examples where the quantum debugging service 36 comprises software instructions that program the processor device 16 to carry out functionality discussed herein, functionality implemented by the quantum debugging service 36 may be attributed herein to the processor device 16. It is to be further understood that while, for purposes of illustration only, the quantum debugging service 36 is depicted as a single component, the functionality implemented by the quantum debugging service 36 may be implemented in any number of components, and the examples discussed herein are not limited to any particular number of components. Moreover, it is noted that while, for purposes of illustration and simplicity, the examples are illustrated as being implemented by a processor device set that includes a single processor device on a single computing device, in other environments, such as a distributed and/or clustered environment, the examples may be implemented on a computer system that includes a processor device set that includes a plurality of processor devices of a plurality of different computing devices, and functionality of the examples may be implemented on different processor devices of different computing devices. Thus, irrespective of the implementation, the examples may be implemented on a computer system that includes a processor device set made up of one or more processor devices of one or more computing devices.

Figure 2B:
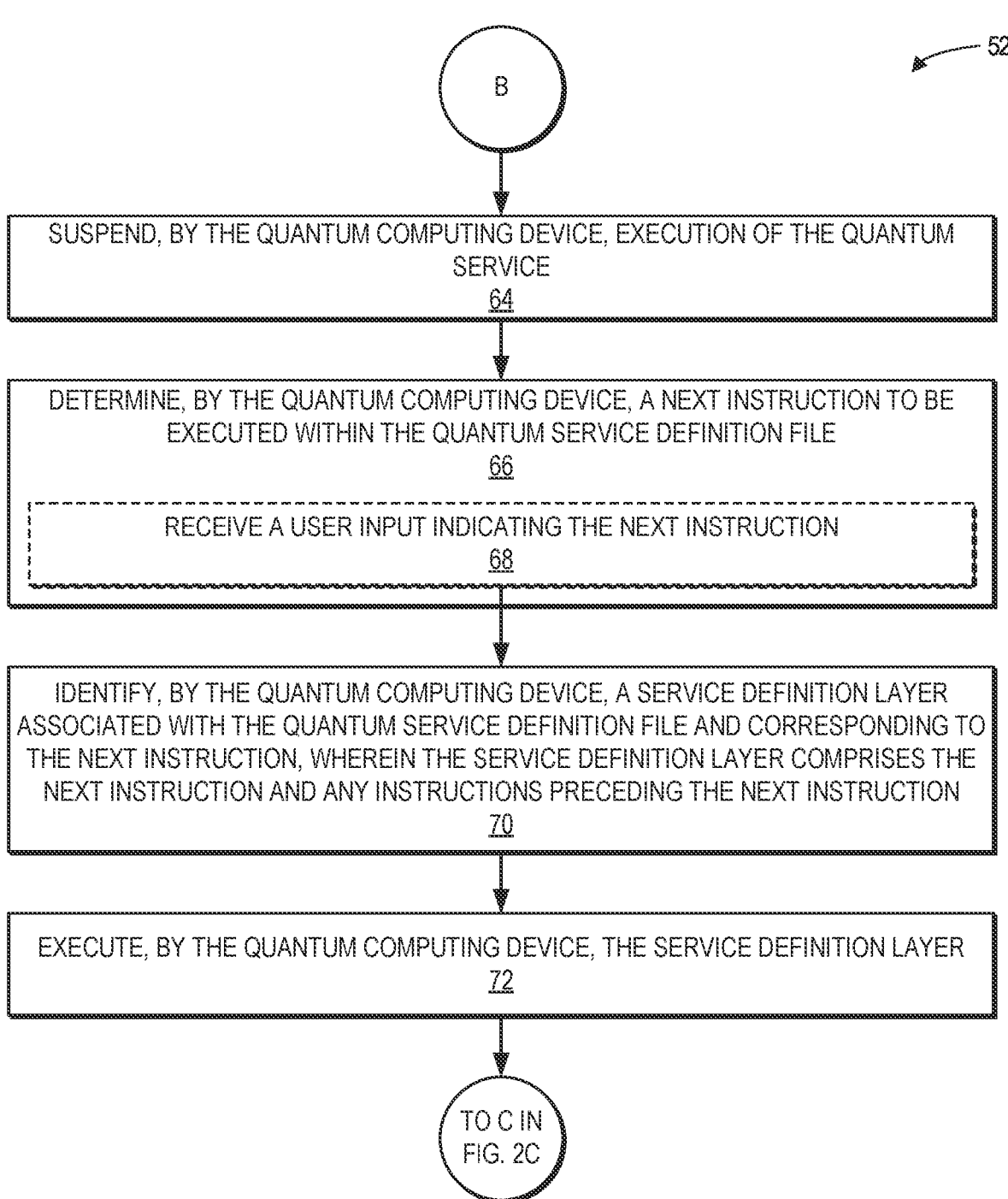
Figure 2C:
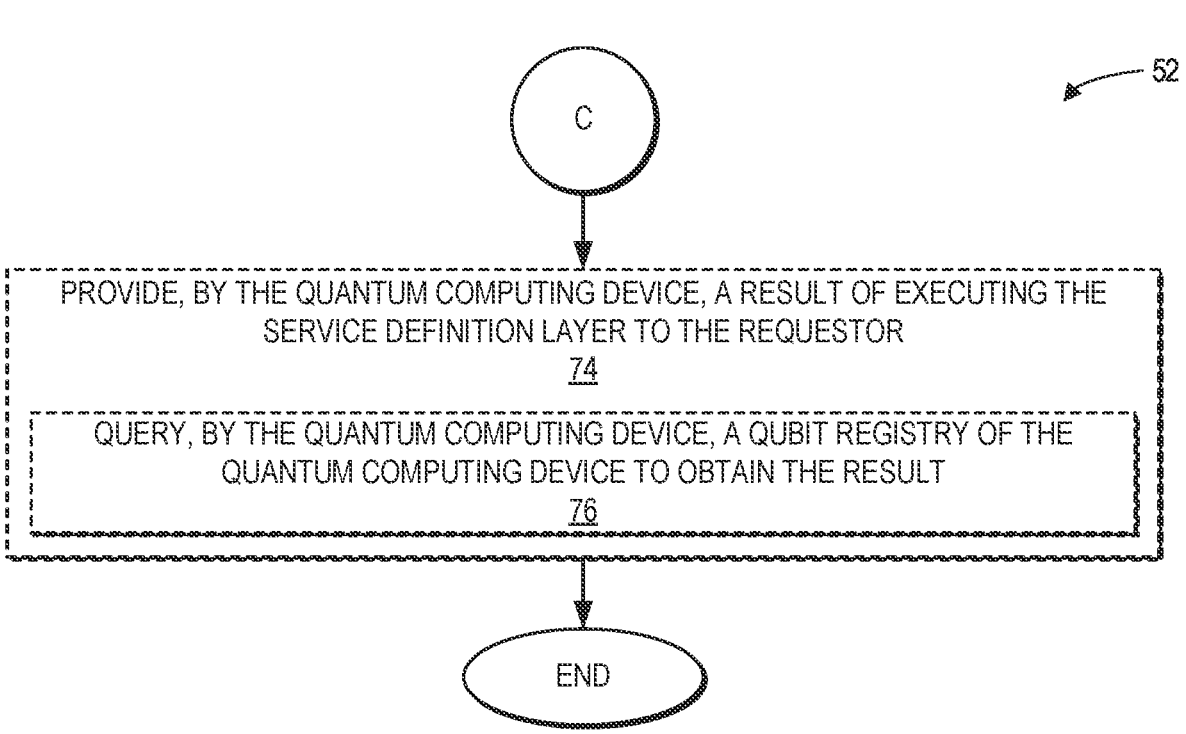

FIGS. 2A-2C provide a flowchart 52 to illustrate exemplary operations performed by the computing system 10 of FIG. 1 for debugging executing quantum services using service definition layers according to one example. Elements of FIG. 1 are referenced in describing FIGS. 2A-2C for the sake of clarity. It is to be understood that, in some examples, some operations illustrated in FIGS. 2A-2C may be performed in an order other than illustrated herein, and/or may be omitted. In FIG. 2A, operations in some examples may begin with the processor device 16 of FIG. 1 (e.g., by executing the quantum debugging service 36 of FIG. 1) generating a plurality of service definition layers (e.g., the service definition layers 38(0)-38(N) of FIG. 1) associated with a quantum service definition file (e.g., the quantum service definition file 26 of FIG. 1), wherein each service definition layer of the plurality of service definition layers 38(0)-38(N) comprises a respective one or more instructions of the quantum service definition file and any instructions preceding the one or more instructions (block 54). The quantum debugging service 36 then stores the plurality of service definition layers 38(0)-38(N) in association with the quantum service definition file 26 (e.g., using the storage device 18 of FIG. 1) (block 56).

The quantum debugging service 36 receives, from a requestor such as the requestor 42 of FIG. 1, a request (e.g., the request 40 of FIG. 1) to debug the executing quantum service 22 defined by the quantum service definition file 26 (block 58). In some examples, the operations of block 58 for receiving the request 40 may be responsive to detection of a breakpoint, such as the breakpoint 46 of FIG. 1, within the quantum service definition file 26 (block 60). Some examples may provide that the operations of block 58 for receiving the request 40 comprise receiving a user input requesting an interruption of execution of the quantum service 22 (e.g., the user input 44 of FIG. 1) (block 62). Operations then continue at block 64 of FIG. 2B.

Referring now to FIG. 2B, the quantum debugging service 36 suspends execution of the quantum service 22 (block 64). The quantum debugging service 36 next determines a next instruction (e.g., the instruction 28(2) of FIG. 1) to be executed within the quantum service definition file 26 (block 66). According to some examples, the operations of block 66 for determining the next instruction 28(2) may comprise receiving a user input indicating the next instruction 28(2) (e.g., the user input 48 of FIG. 1) (block 68). The quantum debugging service 36 identifies a service definition layer (e.g., the service definition layer 38(2) of FIG. 1) associated with the quantum service definition file 26 and corresponding to the next instruction 28(2), wherein the service definition layer 38(2) comprises the next instruction 28(2) and any instructions 28(0)-28(1) preceding the next instruction 28(2) (block 70). The quantum debugging service 36 then executes the service definition layer 38(2) (block 72). Operations according to some examples may continue at block 74 of FIG. 2C.

Turning now to FIG. 2C, the quantum debugging service 36 in some examples may provide a result (e.g., the result 50 of FIG. 1) of executing the service definition layer 38(2) to the requestor 42 (block 74). Some examples may provide that the operations of block 74 for providing the result 50 may comprise the quantum debugging service 36 querying a qubit registry (e.g., the qubit registry 30 of FIG. 1) of the quantum computing device 12 to obtain the result 50 (block 76).

Figure 3:
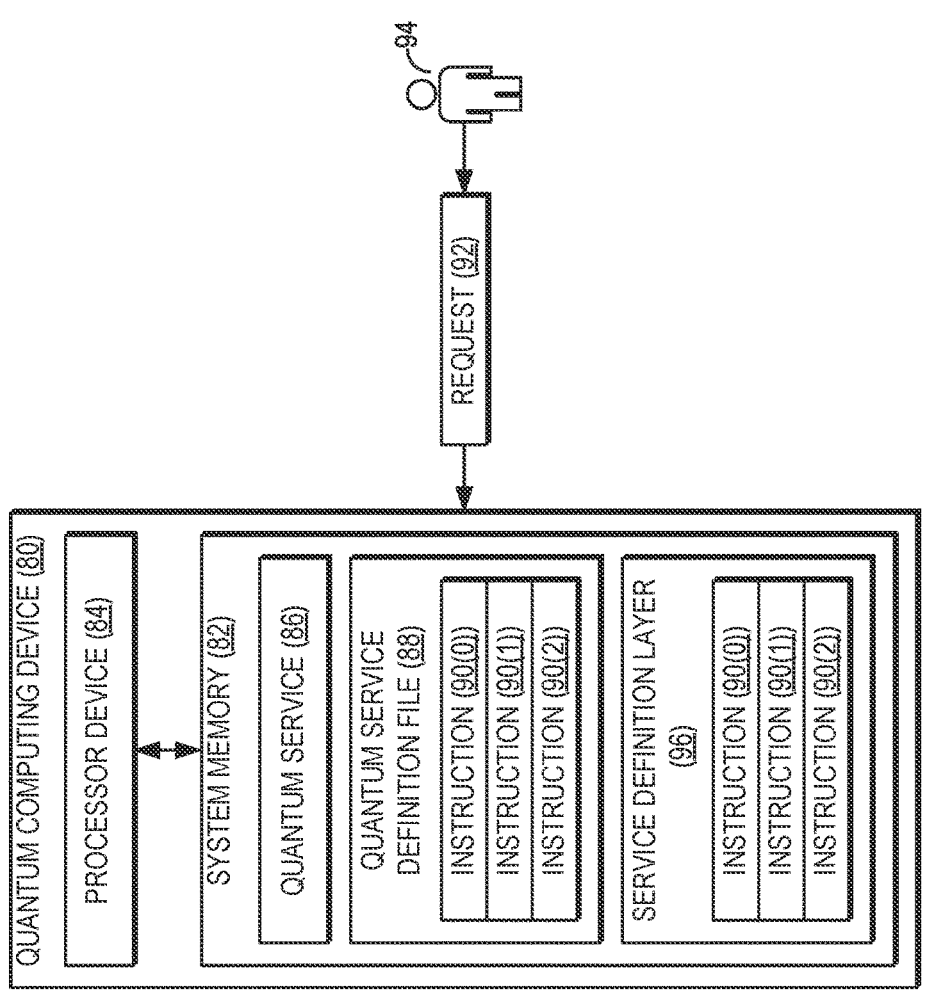
FIG. 3 is a simpler block diagram of the computing system of FIG. 1 for debugging executing quantum services using service definition layers, according to one example.

FIG. 3 is a simpler block diagram of the computing system 10 of FIG. 1 for debugging executing quantum services using service definition layers, according to one example. In the example of FIG. 3, a computing system 78 includes a quantum computing device 80 that comprises a system memory 82 and a processor device 84. The processor device 84 executes a quantum service 86 defined by a quantum service definition file 88 comprising a plurality of instructions 90(0)-90(2). In exemplary operation, the processor device 84 receives a request 92 to debug the executing quantum service 86 from a requestor 94. The processor device 84 determines a next instruction 90(2) to be executed within the quantum service definition file 88 and identifies a service definition layer 96 associated with the quantum service definition file 88 as corresponding to the next instruction 90(2). The service definition layer 96 comprises the next instruction 90(2) and any instructions 90(0)-90(1) preceding the next instruction 90(2). The processor device 84 then executes the service definition layer 96.

To illustrate a simplified method for debugging executing quantum services using service definition layers in the computing system 78 of FIG. 3 according to one example, FIG. 4 provides a flowchart 98. Elements of FIG. 3 are referenced in describing FIG. 4 for the sake of clarity. In FIG. 4, operations begin with the processor device 84 of the quantum computing device 80 receiving, from the requestor 94, the request 92 to debug the executing quantum service 86 defined by the quantum service definition file 88 (block 100). The processor device 84 suspends execution of the quantum service 86 (block 102). The processor device 84 then determines the next instruction 90(2) to be executed within the quantum service definition file 88 (block 104). The processor device 84 identifies the service definition layer 96 associated with the quantum service definition file 88 and corresponding to the next instruction 90(2), wherein the service definition layer 96 comprises the next instruction 90(2) and any instructions 90(0)-90(1) preceding the next instruction 90(2) (block 106). The processor device 84 then executes the service definition layer 96 (block 108).

Figure 5:
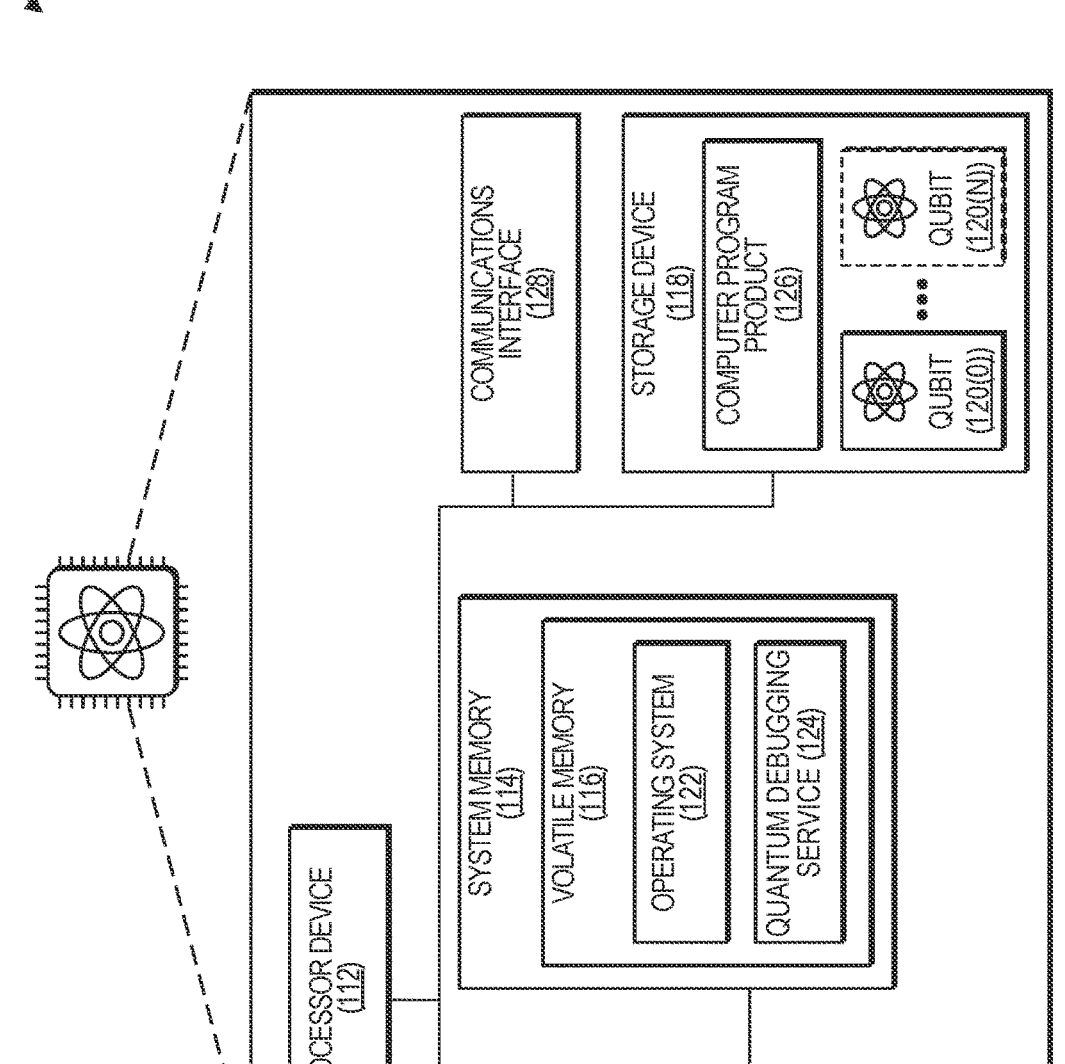
FIG. 5 is a block diagram of a quantum computing device suitable for implementing examples, according to one example.

FIG. 5 is a block diagram of a quantum computing device 110, such as the quantum computing device 12 of FIG. 1, suitable for implementing examples according to one example. The quantum computing device 110 may comprise any suitable quantum computing device or devices. The quantum computing device 110 can operate using classical computing principles or quantum computing principles. When using quantum computing principles, the quantum computing device 110 performs computations that utilize quantum-mechanical phenomena, such as superposition and entanglement. The quantum computing device 110 may operate under certain environmental conditions, such as at or near zero degrees (0°) Kelvin. When using classical computing principles, the quantum computing device 110 utilizes binary digits that have a value of either zero (0) or one (1).

The quantum computing device 110 includes a processor device 112 and a system memory 114. The processor device 112 can be any commercially available or proprietary processor suitable for operating in a quantum environment. The system memory 114 may include volatile memory 116 (e.g., random-access memory (RAM)). The quantum computing device 110 may further include or be coupled to a non-transitory computer-readable medium such as a storage device 118. The storage device 118 and other drives associated with computer-readable media and computer-usable media may provide non-volatile storage of data, data structures, computer-executable instructions, and the like. The storage device may also provide functionality for storing one or more qubits 120(0)-120(N).

A number of modules can be stored in the storage device 118 and in the volatile memory 116, including an operating system 122 and one or more modules, such as a quantum debugging service 124. All or a portion of the examples may be implemented as a computer program product 126 stored on a transitory or non-transitory computer-usable or computer-readable medium, such as the storage device 118, which includes complex programming instructions, such as complex computer-readable program code, to cause the processor device 112 to carry out the steps described herein. Thus, the computer-readable program code can comprise computer-executable instructions for implementing the functionality of the examples described herein when executed on the processor device 112.

An operator may also be able to enter one or more configuration commands through a keyboard (not illustrated), a pointing device such as a mouse (not illustrated), or a touch-sensitive surface such as a display device (not illustrated). The quantum computing device 110 may also include a communications interface 128 suitable for communicating with other computing systems, including, in some implementations, classical computing devices.

What is claimed is:

1. A method, comprising:

receiving, by a quantum computing device from a requestor, a request to debug an executing quantum service defined by a quantum service definition file;

suspending, by the quantum computing device, execution of the quantum service;

determining, by the quantum computing device, a next instruction to be executed within the quantum service definition file;

identifying, by the quantum computing device, a service definition layer associated with the quantum service definition file and corresponding to the next instruction, wherein the service definition layer comprises the next instruction and any instructions preceding the next instruction; and executing, by the quantum computing device, the service definition layer.

2. The method of claim 1, further comprising providing, by the quantum computing device, a result of executing the service definition layer to the requestor.

3. The method of claim 2, wherein:

providing the result comprises querying, by the quantum computing device, a qubit registry of the quantum computing device to obtain the result; and the result comprises one or more of a quantum state of a qubit during execution of the service definition layer or a data value stored by a qubit during execution of the service definition layer.

4. The method of claim 1, wherein receiving the request to debug the executing quantum service is responsive to detection of a breakpoint within the quantum service definition file.

5. The method of claim 1, wherein receiving the request to debug the executing quantum service comprises receiving a user input requesting an interruption of execution of the quantum service.

6. The method of claim 1, wherein:

determining the next instruction to be executed comprises receiving a user input indicating the next instruction; and the next instruction comprises an instruction immediately subsequent to a most recently executed instruction, an instruction immediately preceding the most recently executed instruction, or a user-selected instruction within the quantum service definition file.

7. The method of claim 1, further comprising, prior to receiving the request:

generating a plurality of service definition layers associated with the quantum service definition file, wherein:

each service definition layer of the plurality of service definition layers comprises a respective one or more instructions of the quantum service definition file and any instructions preceding the one or more instructions; and the plurality of service definition layers comprises the service definition layer; and storing the plurality of service definition layers in association with the quantum service definition file.

8. A quantum computing device, comprising:

a system memory; and a processor device communicatively coupled to the system memory, the processor device to:

receive, from a requestor, a request to debug an executing quantum service defined by a quantum service definition file;

suspend execution of the quantum service;

determine a next instruction to be executed within the quantum service definition file;

identify a service definition layer associated with the quantum service definition file and corresponding to the next instruction, wherein the service definition layer comprises the next instruction and any instructions preceding the next instruction; and execute the service definition layer.

9. The quantum computing device of claim 8, wherein the processor device is further to provide a result of executing the service definition layer to the requestor.

10. The quantum computing device of claim 9, wherein:

to provide the result is to query a qubit registry of the quantum computing device to obtain the result; and the result comprises one or more of a quantum state of a qubit during execution of the service definition layer or a data value stored by a qubit during execution of the service definition layer.

11. The quantum computing device of claim 8, wherein to receive the request to debug the executing quantum service is to receive the request responsive to detection of a breakpoint within the quantum service definition file.

12. The quantum computing device of claim 8, wherein to receive the request to debug the executing quantum service is to receive a user input requesting an interruption of execution of the quantum service.

13. The quantum computing device of claim 8, wherein:

to determine the next instruction to be executed is to receive a user input indicating the next instruction; and the next instruction comprises an instruction immediately subsequent to a most recently executed instruction, an instruction immediately preceding the most recently executed instruction, or a user-selected instruction within the quantum service definition file.

14. The quantum computing device of claim 8, wherein the processor device is further to, prior to receiving the request:

generate a plurality of service definition layers associated with the quantum service definition file, wherein:

each service definition layer of the plurality of service definition layers comprises a respective one or more instructions of the quantum service definition file and any instructions preceding the one or more instructions; and the plurality of service definition layers comprises the service definition layer; and store the plurality of service definition layers in association with the quantum service definition file.

15. A non-transitory computer-readable medium having stored thereon computer-executable instructions that, when executed, cause one or more processor devices of a quantum computing device to:

receive, from a requestor, a request to debug an executing quantum service defined by a quantum service definition file;

suspend execution of the quantum service;

determine a next instruction to be executed within the quantum service definition file;

identify a service definition layer associated with the quantum service definition file and corresponding to the next instruction, wherein the service definition layer comprises the next instruction and any instructions preceding the next instruction; and execute the service definition layer.

16. The non-transitory computer-readable medium of claim 15, wherein the computer-executable instructions further cause the one or more processor devices to provide a result of executing the service definition layer to the requestor.

17. The non-transitory computer-readable medium of claim 16, wherein:

to provide the result is to query a qubit registry of the quantum computing device to obtain the result; and the result comprises one or more of a quantum state of a qubit during execution of the service definition layer or a data value stored by a qubit during execution of the service definition layer.

18. The non-transitory computer-readable medium of claim 15, wherein to receive the request to debug the executing quantum service is to receive the request responsive to detection of a breakpoint within the quantum service definition file.

19. The non-transitory computer-readable medium of claim 15, wherein to receive the request to debug the executing quantum service is to receive a user input requesting an interruption of execution of the quantum service.

20. The non-transitory computer-readable medium of claim 15, wherein:

to determine the next instruction to be executed is to receive a user input indicating the next instruction; and the next instruction comprises an instruction immediately subsequent to a most recently executed instruction, an instruction immediately preceding the most recently executed instruction, or a user-selected instruction within the quantum service definition file.

* * * * *